(12) United States Patent
Steinich (10) Patent No.: US 7,982,453 B2
(45) Date of Patent: Jul. 19, 2011

(54) MAGNETORESTRICTIVE DISTANCE MEASURING DEVICE

(75) Inventor: Klaus Manfred Steinich, Zorneding (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 993 days.

(21) Appl. No.: 11/578,816

(22) PCT Filed: Apr. 19, 2005

(86) PCT No.: PCT/EP2005/004170
§ 371 (c)(1),
(2), (4) Date: Aug. 10, 2007

(87) PCT Pub. No.: WO2005/100907
PCT Pub. Date: Oct. 27, 2005

(65) Prior Publication Data
US 2007/0296404 A1    Dec. 27, 2007

(30) Foreign Application Priority Data
Apr. 19, 2004  (DE) .......................... 10 2004 018 818

(51) Int. Cl.
  *G01B 7/14*         (2006.01)
(52) U.S. Cl. .................................................. 324/207.13
(58) Field of Classification Search .............. 324/207.13
See application file for complete search history.

(56) References Cited

U.S. PATENT DOCUMENTS

| | | | | |
|---|---|---|---|---|
| 5,406,200 A | * | 4/1995 | Begin et al. | 324/207.12 |
| 2002/0135359 A1 | * | 9/2002 | Steinich | 324/207.13 |
| 2003/0076089 A1 | * | 4/2003 | Kurz et al. | 324/207.13 |

FOREIGN PATENT DOCUMENTS

DE       101 08 925 A1   9/2002

* cited by examiner

*Primary Examiner* — Jay M Patidar
(74) *Attorney, Agent, or Firm* — Head, Johnson & Kachigian, P.C.

(57) ABSTRACT

A distance measuring device, in particular a magnetostrictive distance measuring device wherein a distance measuring element extends in longitudinal direction of the device along the measurable measuring distance, relative to which a signal generating signal generator can be moved in longitudinal direction, with a longitudinal housing shaped as a circumferentially enclosed profile (1) with constant cross section contour in longitudinal direction (10), a wave conductor unit in the interior of the profile (1), wherein the wave conductor of the wave conductor unit extends in longitudinal direction (10) of the profile (1), processing electronics in the interior of the profile (1), a traveler moveable in longitudinal direction (10) along the outside of the profile (1), in particular with a magnet as signal generator, wherein the profile (1) is shaped so that it can be positioned in lateral direction in a form fit manner, within a circular interior contour surrounding the outside contour of the profile (1) by more than 180°, so that it still can be rotated inside the interior contour.

29 Claims, 11 Drawing Sheets

MAGNETORESTRICTIVE DISTANCE MEASURING DEVICE

CROSS-REFERENCE TO RELATED APPLICATION

This application is the US National Phase of PCT Application No. WO/2005/100907A2 published 27 Oct. 2005 (PCT/EP/2005/004170 filed 19 Apr. 2005) which claims priority to German Application No. 10 2004 018 818.1 filed 19 Apr. 2004.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention regards a distance measuring device, in particular, a magnetostrictive distance measuring device.

The basic principle is that a distance measuring element extends in longitudinal direction of the device along the measurable measuring distance with a signal generating position sensor moveable relative to it in longitudinal direction.

In a magnetostrictive distance measuring device, the basic principle of such a device is refined so that a wave conductor made from a material that is electrically conductive, and can also be magnetized in measuring direction, extends in the longitudinal direction of the device, in particular, in a slightly taunt state.

A magnet is connected to the component, whose position in longitudinal direction is to be measured or surveyed, and is moved through this component in longitudinal direction along the wave conductor without touching it but with a sufficiently small distance.

An electrical impulse entered into the wave conductor causes a mechanical wave in response to the magnet, which propagates from the position of the magnet along the wave conductor and which is detected by the processing electronics mostly located at the end of the wave conductor, with respect to its travel time, from which the longitudinal position of the magnet and thereby of the component to be surveyed relative to the wave conductor is known.

Since such distance measuring devices are often used in machines, also in manufacturing machines, they have to comply with a group of requirements, e.g. protection of the measuring device against mechanical impact and contamination, in particular, against penetration of moisture into the processing electronics, maintenance of the initial tension of the wave conductor, shielding of the electromagnetic radiation of the processing electronics to the outside and to the inside, ease of mounting and maintenance of the measuring device.

On the one hand, it is state of the art to receive the wave conductor in a supporting but not too strongly dampening enclosure and handling the wave conductor unit this way.

On the other hand, it is state of the art to locate the wave conductor or the above mentioned wave conductor unit protected in the interior of a circumferentially enclosed, hollow tubular profile, which can be economically produced as an extruded profile.

Thereby the tubular profiles, depending on the application, have to fulfill different requirements, such as:

high stiffness against bending loads in lateral direction;
low space requirement, especially as a very flat tubular profile;
symmetric shape of the interior of the tube for various applications;
specific mounting of the tubular profile relative to the base;
Rotability of the tubular cross section, in particular also in already mounted state, relative to the component carrying the profile;
particularly economic manufacture; and
Capability of locating it in an additional, protective second housing.

BRIEF SUMMARY OF THE INVENTION

The object of the present invention is to fulfill as many of the above mentioned requirements, as possible, simultaneously, while being producible in a simple and fast manner.

Through the specific design of the outside contour of the profile, so that within an interior contour, which comprises part of the profile, but more than 180°, a defined positioning in lateral direction and also rotability of the profile is provided, so that the assembled device, though mounted with conventional clamps, brackets and bearing mounts or other holders, can provide a fixation, and at least after the coarse fixation, can still provide a rotation of the profile around its longitudinal axis for fine positioning, greatly facilitating assembly.

In order to know close to which spot of the circumference of the profile the wave conductor is positioned in the interior, a marker is provided on the profile or on the closing end cap.

Preferably, the outer contour, at least in sections, comprises an enveloping circle over which the outer circumference of the profile does not protrude at any spot.

In order to still have mounting capabilities at the exterior circumference, outside grooves, open towards the outside, are located along the outer circumference preferably several of them, in particular, symmetrically spaced along the circumference. Preferably, these outside grooves are provided as so called combination grooves, whose circumference is, on the one hand, suitable for stringing in bolts in longitudinal direction, and, on the other hand, for inserting plate shaped elements, like mounting brackets or the protrusions of the traveler to be guided on the outside of the profile in lateral direction.

For this purpose, the combination grooves are, for example, vase-shaped having a circular segment shaped cross section in the lower area of the groove, the groove preferably having a flat bottom, with a neck extending and expanding outward from this lower area in a V-shape, so that the tightest spot of the combination groove is the transition between the neck and the lower area.

Preferably, four outside grooves, in particular four combination grooves, are spaced around the circumference of the profile, preferably symmetrical to the central longitudinal plane and also to the perpendicular lateral central plane.

The interior contour of the circumferentially enclosed profile cross section is determined through the fact that at least one wave conductor groove has to be provided there and at least a pair of printed circuit board grooves have to be provided, preferably two each, in order to allow a redundant design of the distance measuring device, thus with two wave conductor units and two associated printed circuit boards with processor circuits located on them.

The wave conductor groove hereby is an undercut groove, in particular, a groove with a circular interior circumference whose interior diameter is selected so that the typical cylindrical wave conductor unit can be inserted from-fit in longitudinal direction so it cannot slip out in lateral direction. The wave conductor groove is thereby open towards the interior of the profile, as well as the pairs of opposite printed circuit board grooves, into which the printed circuit boards are inserted with their longitudinal edges.

The position fixation of the printed circuit boards in longitudinal direction is performed through friction, through one or two elastic, extended strings inserted along the longitudinal edges of the printed circuit board into the bottom of the groove, like rubber or silicon or a respective hose, which is released after longitudinal positioning at the desired spot, and which clamps the printed circuit board between the printed circuit board grooves through the subsequent lateral expansion of the elastic hose or the elastic string.

The wave conductor unit by itself, on the other hand, has a friction coefficient high enough, relative to the interior circumference of the wave conductor groove, in order not to move by itself anymore after insertion in longitudinal direction, since it also comprises a slippage inhibiting elastic hose, e.g. from silicone, which can also be stretched for inserting the wave conductor unit.

The printed circuit board grooves are hereby located so that the printed circuit boards to be inserted—parallel to each other—lie perpendicular to the longitudinal center plane, defined through the middle of the profile and through the middle of at least one wave conductor groove, or through the connection line between two wave conductor grooves.

The other possibility is to arrange the printed circuit board grooves so that the respective inserted printed circuit boards lie parallel to the central longitudinal plane, certainly laterally offset relative to the wave conductor grooves.

Preferably, also the printed circuit board grooves are internally undercut grooves, in particular, combination grooves.

Depending on the primary goal to be selected, the profile itself can have a wall thickness as constant as possible on all sides of the circumference, thus with a thickness variation with a maximum of plus or minus 30%, in particular a maximum of plus or minus 20%, or to the contrary it can accumulate as much material as possible, besides the necessary cavities in the interior, thus for housing the printed circuit boards and the components located on them and the wave conductor units, so that in a radial direction the measured wall thickness at the thickest spot is at least three times, better five times, the wall thickness at the thinnest spot.

Preferably, the interior contour has two, in particular, opposing wave conductor grooves and two or better three pairs of printed circuit board grooves, in particular, also for locating printed circuit boards with different widths.

The interior contour is thereby provided symmetrical, preferably to the central longitudinal plane, in particular and/or to the lateral central plane.

Preferably, the closing cap is placed blunt onto a front face of the profile, or it is bolted onto it—with a gasket in between—through respectively located bolt holes of the closing cap, a bolting into the outside grooves of the profile is performed through common self cutting bolts e.g. sheet metal screws or self stringing bolts, whereby the seal passes around without interruption e.g. inside the bolt pattern.

The gasket can be a flat gasket, also not protruding beyond the outside contour of the profile, or and O-ring, resting in a respective groove manufactured into the front face of either the profile or the closing cap, which is not at all circular, but can follow the interior contour.

The flat gasket can also protrude in a defined manner—especially beyond certain circular segments—beyond the exterior circumference of the profile in order to create a defined centering and friction in longitudinal direction in the interior of a surrounding protective tube through these overhanging portions.

In order to assure a defined precompression of the gasket, the closing cap has extensions protruding in longitudinal direction, spaced over its front face, through which the closing cap directly abuts to the front face of the profile, through which a defined distance between closing cap and front face of the profile is assured, as well as a defined precompression of the gasket, located in between.

The passage of the cable through the closing cap occurs through a respective cable opening, into which a cable grommet is stringed, or through a cable grommet integrally formed with the closing cap. Instead of a pass through cable, a plug socket can be located directly in the cable grommet, which in turn is sealed towards the interior circumference of the grommet with an O-ring, or which is glued in, so that a connection of the device through a connector plug is possible.

The closing cap and/or the profile preferably are made of electrically conductive material, metal in particular, zinc in particular. Due to the at least segmentally round exterior circumference of the profile, or of a protective tube surrounding the profile, the mounting to the base either of the profile or the tube can be performed through commercially available fixtures like hose clamps, bearing supports, brackets or similar, whereby the brackets have an opening, eccentrically positioned, for imparting the stringing, in order to be able to effect an engagement into the outside groove with a loose bolt connection, only through rotating the bracket.

The signal generating element, moveable along the longitudinal direction of the device, mostly a traveler with a magnet, can thereby either be guided through a surrounding component, and not have contact with the profile or the protective tube surrounding the profile, or be guided along the profile, or protective tube in a form fit manner.

A very simple possibility hereby is to use elements analogous to mounting relative to the base, like hose clamps, bearing supports, etc., but with slightly larger interior diameter, in order to be able to move this element with little friction along the outer contour of the profile in a form fit manner.

Another possibility consists in having the traveler reach into the respective outer grooves of the profile in a form fit manner, through respective protrusions in order to guide it along the outer circumference.

The distance measuring device completed in this manner can be additionally protected through inserting and encapsulating it into an additional surrounding protective tube, whose interior diameter is slightly larger than the exterior diameter of the profile. For this purpose, also, the protective tube, which for example can be a solid steel tube, e.g. from stainless steel, can be closed on one side, which can be performed in an economical manner through attaching compressible end caps according to the "Sanpress" principle, which is known in the plumbing industry.

Thereby, an end cap, into whose interior circumference already a slightly internally protruding O-ring is inserted, is pushed over the end of the external circumference of the tube and is compressed tight with a special pressing tool in a radial manner.

Certainly also in this case, the signal has to be run out through one of the end caps through a cable passage, or through a plug connector. Also, the profile itself, theoretically, could be closed with such an end cap according to the "Sanpress" principle, whereby the cavities formed by the outside grooves have to be closed by inserting elastic clamping elements into the end areas of the grooves in an axial direction, to be positioned in the area, where the external circumferential O-ring of the end cap is pressed on.

This way, however, the closing cap formed as an end cap protrudes beyond the outer circumference of the profile, so that a device closed in this manner cannot be inserted into a protective tube, which is only slightly larger than the outer circumference of the profile.

The radial support of the profile in the protective tube and the centering is performed through inserting spacers, spaced amongst each other in longitudinal direction, made from elastic material e.g. rubber or silicone, into the outer grooves, which center the profile relative to the interior after inserting it into the protective tube. For spacers, small O-rings or sections of a silicone hose are used, whose thickness is slightly larger than the smallest width of the outside grooves, so that spacers inserted there remain in position by themselves.

Thus, the process for manufacturing a distance measuring device simply works as follows:

Starting with the desired measuring distance, the calculated total length of the tubular profile is cut off from basically endless extruded profile material, the wave conductor is cut to the required length the same way.

After the wave conductor is assembled into a wave conductor unit, the final assembly is performed.

Initially, the wave conductor unit is inserted into the wave conductor groove in the interior of the profile and fixated there, which is normally accomplished through friction and/or gluing in the end area.

The elastic hose surrounding the wave conductor unit is extended and thereby thinned out radially and after releasing this axial preload, the thickening hose clamps the wave conductor unit in the wave conductor groove. In addition or instead—especially in the starting area close to the processing electronics—a gluing of the wave conductor unit relative to the profile can be performed.

Likewise, the printed circuit board is treated, which carries the processing electronics. Also, this is inserted between two printed circuit board grooves in the interior of the profile until it does not protrude from it at the front face. Also, here a positional fixation is performed in the grooves, which avoids a lateral displacement through form fit, in axial direction through friction (as with the wave conductor unit), through inserting an extended and thereby thinned hose or a string from elastic material e.g. rubber or silicone between one of the grooves and the respective narrow side of the circuit board. After releasing the preload of the elastic string/hose, a clamping of the printed circuit boards in the grooves is performed through expansion in radial direction.

Thereafter, the wave conductor unit is connected with the processing electronics in the interior of the profile and the wires leading from the electronics to the outside are run through one of the closing caps, to be placed, or they are connected with the plug socket located in the closing cap.

Subsequently, the closing caps are attached and mounted, e.g. through blunt placement onto the front face of the profile and bolting down the end caps with screws, which engage the outside grooves in a self stringing manner and can be fixated there.

In order to avoid malfunctions of the device, it is necessary to thoroughly clean the interior of the profile, cut to length, preferably with compressed air.

In case the distance measuring device completed in this manner is to be used in a particularly rough environment e.g. with impending mechanical impacts, it can be additionally housed in the interior of a protective tube having a slightly larger interior diameter than the exterior diameter of the profile. Also, here, the distance measuring device is inserted from one of the open face ends into the protective tube, and the protective tube is closed with end caps on both sides, again running the electrical conductors out of at least one end cap or connecting a plug internally, which is housed in one of the end caps.

The end caps are placed onto the protective tube, which is preferably a normal tube with circular interior cross section and exterior cross section and constant wall thickness, and closed according to the "Sanpress"—principle used in the plumbing industry.

In the pot-shaped end-caps, in the interior a respective O-ring is already inserted in an interior circumferential groove. The end-caps are pushed over the exterior circumference of the tube in the end area, and they are clamped in the desired position with special clamping pliers which create a solid and gas tight connection of the end-cap with the tube.

BRIEF DESCRIPTION OF THE DRAWINGS

An embodiment according to the invention is subsequently described in more detail through figures in an exemplary manner.

DETAILED DESCRIPTION OF THE INVENTION

Figure 1A:
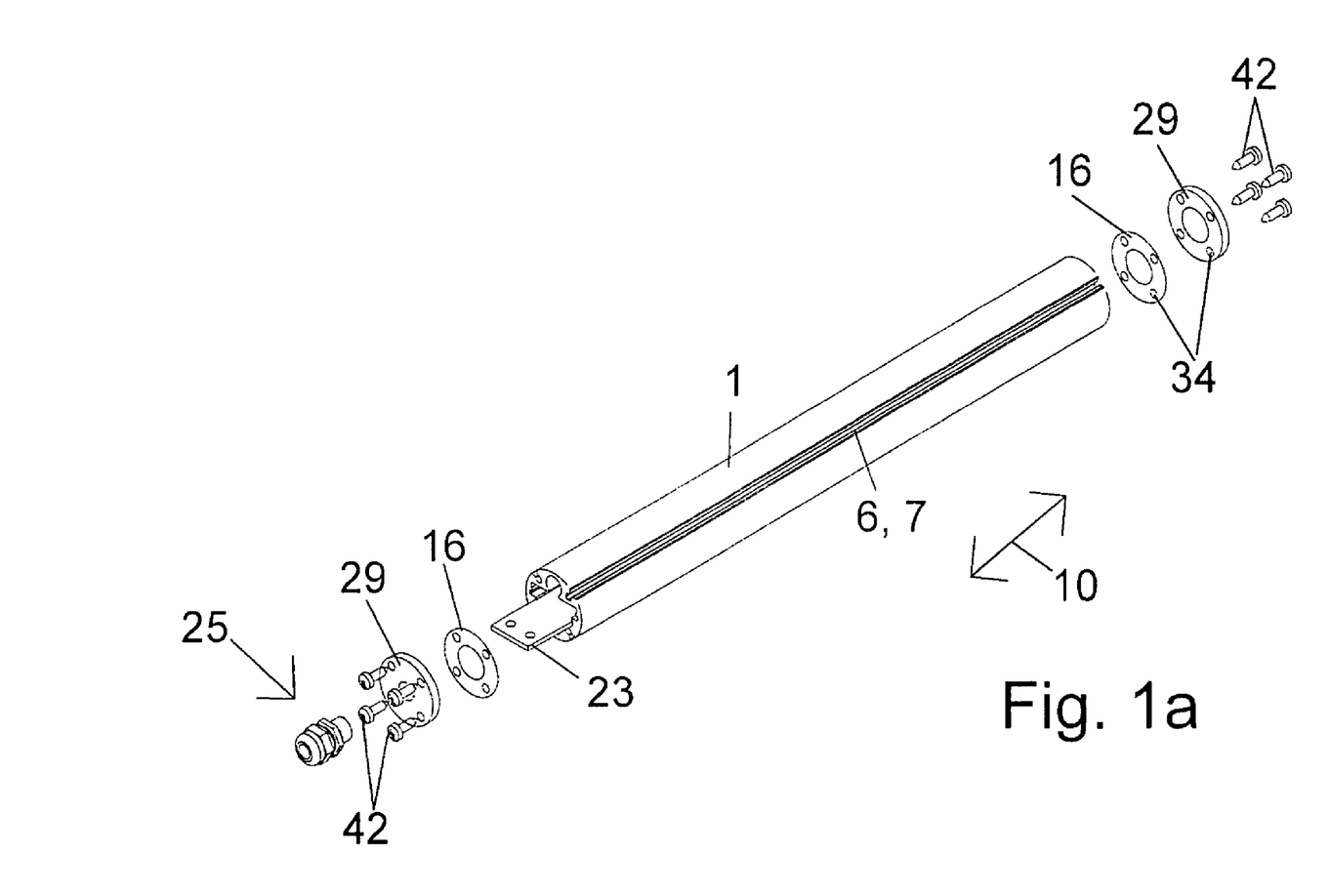
FIGS. 1a-b show a distance measuring device in an exploded view.
Figure 1B:
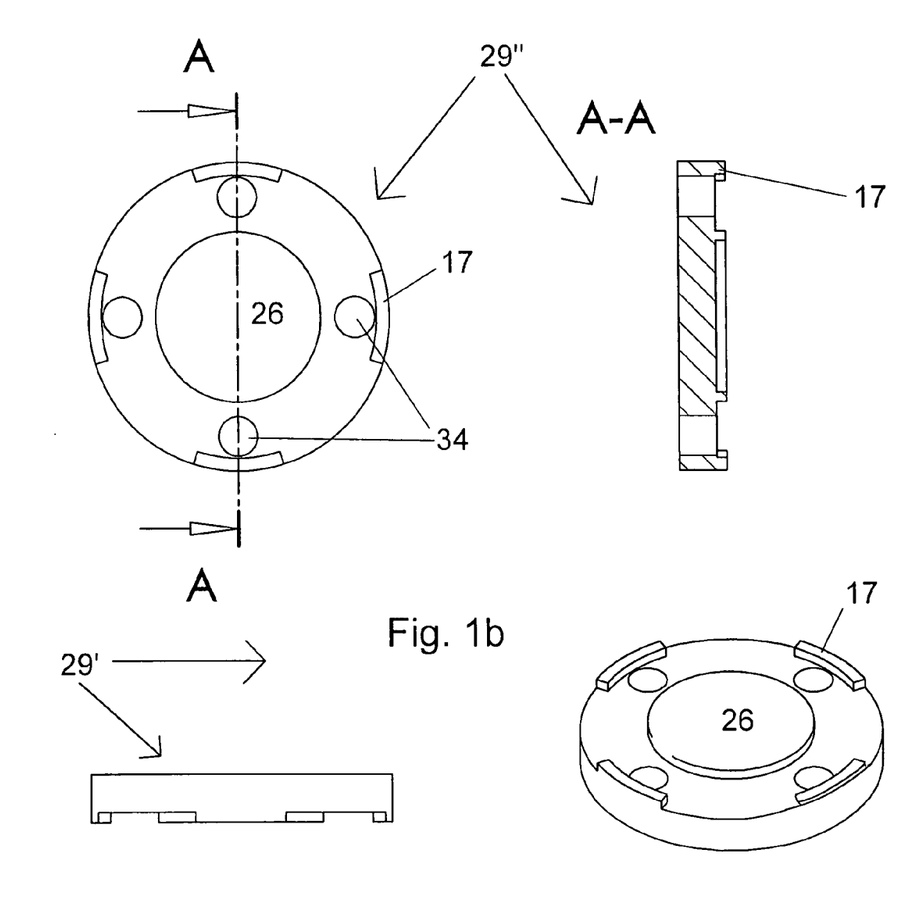

FIG. 1 shows the distance measuring device during final assembly in an exploded view.

A printed circuit board 23 is not yet completely inserted into a profile 1 from the front side, since in the final state the printed circuit board does not protrude from the front side of the profile 1. The same is true for a wave conductor unit 2, which is not visible in FIG. 1a, since it is below the printed circuit board 23. Both elements are shown in the frontal view of FIG. 6c, in which also the interior and exterior contour of profile 1 can better be seen.

There it can be seen, that an outside contour 5 of profile 1 is circular, besides the four external grooves 6, equally spaced along the circumference, manufactured from the outside into the interior of profile 1, but not connected with an interior 14 of profile 1. All four external grooves 6 are provided as combination grooves with a deep seated undercut area 7a, as seen from the external contour 5, with a circular cross section, whose bottom area forms a flat bottom 7*b* area and is further deepened relative to undercut circular segment shaped area 7*a*.

The open section of the expanded area 7*b* is connected to the outer contour 5 via a V shaped, towards the outside expanding area 7*c*, so that an overall vase shape of the combination grooves 7 is created.

The interior contour has a central approximately rectangular interior cavity 14 in whose narrow sides printed circuit board grooves 19*a,b,c* with approximately rectangular cross section are provided, so that between each pair of printed circuit board grooves a printed circuit board 23 can be inserted, wherein such a printed circuit board 23 normally does not extend over the whole length of the profile, but from one end only 10-15 cm into profile 1, while the total length of the profile can be 1 m or also 5 m.

From the broad sides of the interior space 14, two each other opposing wave conductor grooves 20 extend into profile 1. An interior contour of the grooves 20 forms a circular segment extending over approximately 270°.

A connection line of the two wave conductor grooves 20 defines a longitudinal center plane 9, so that printed circuit board 23 as seen in FIG. 6*c*, connected via two electrical conductors 40 with wave conductor unit 2, located in the upper wave conductor groove 20, constitutes a functional distance measuring device.

In addition, printed circuit board grooves 19*d* can also be present in broad sides located opposed to each other relative to the interior space 14, next to the wave conductor grooves 20, for inserting printed circuit board 23, which would then lie in parallel to the longitudinal central plane 9.

Independent of that, through inserting an additional printed circuit board 23 and an additional wave conductor 2, in particular, from the opposed front face of profile 1, a double and thereby redundant equipment of profile 1 could be provided.

FIG. 6*c* also shows the fixation of those components in profile 1: a tubular wave conductor 3 is surrounded by a hose 38 serrated through longitudinal grooves, together forming the wave conductor unit 2. This unit is inserted in longitudinal direction 10, through longitudinally extending the serrated hose 38, reducing its external circumference, so it can be inserted into the wave conductor groove 21 without much friction.

After releasing the axial tension, hose 38 expands in radial direction, clamping wave conductor 3 in longitudinal direction in the wave conductor groove 20 through friction. The free opening towards the interior space 14 is too small for the wave conductor unit 2 to move out of groove 20.

Also, printed circuit board 23 is mounted and fixated in a similar manner: between the base of a respective printed circuit board groove 19*b* and the opposite short sides of printed circuit board 23 an elastic string 15 is inserted, again made from rubber material, silicone or a similarly slip restricting material. The width of printed circuit board 23 relative to the distance of the pair of printed circuit board grooves 19*b* is sized so that, string 15 preloaded in longitudinal, axial direction 10, and thereby string 15 thinned in lateral direction (as a replacement also a hollow hose can be used) it can be inserted together with printed circuit board 23 between grooves 19*b* in longitudinal direction 10. After releasing tension of string 15 in longitudinal direction, string 15 thickens in lateral direction, reliably clamping printed circuit board 23 between circuit board grooves 19*b*.

Ends of hose 38 or string 15 which protrude beyond front face of profile 1 are cut off subsequently.

As can be seen, outside grooves 6, formed as combination grooves 7, reach into corner areas towards the inside, which an interior contour 4 leaves between the rectangular interior space 14 and the centrally outward protruding wave conductor grooves 20. Thereby, different wall thicknesses are created, wherein the thinnest wall thickness is created in the area between an exterior circumference and the outmost point of wave conductor groove 20. The largest radial wall thickness is created slightly to the side of external grooves 6. The widely differing wall thicknesses provide a radial rib structure of profile 1, providing a high stiffness against bending in lateral direction, and on the other hand, sufficient material accumulation in order to provide a circumferential groove 28 running around interior space 14 and grooves 20 in a front face 22, to insert an O-ring 24 as a seal between front face 22 of profile 1 and a flush closing cap 29, 29'.

Thereby, it is apparent that outside contour 5 does not protrude at any spot outward beyond an enveloping circle 21, formed by the circular segments of the outside contour 5, since deviations from this enveloping circle 21 only exists in the outside grooves 6, deepened towards the inside.

Figure 7A:
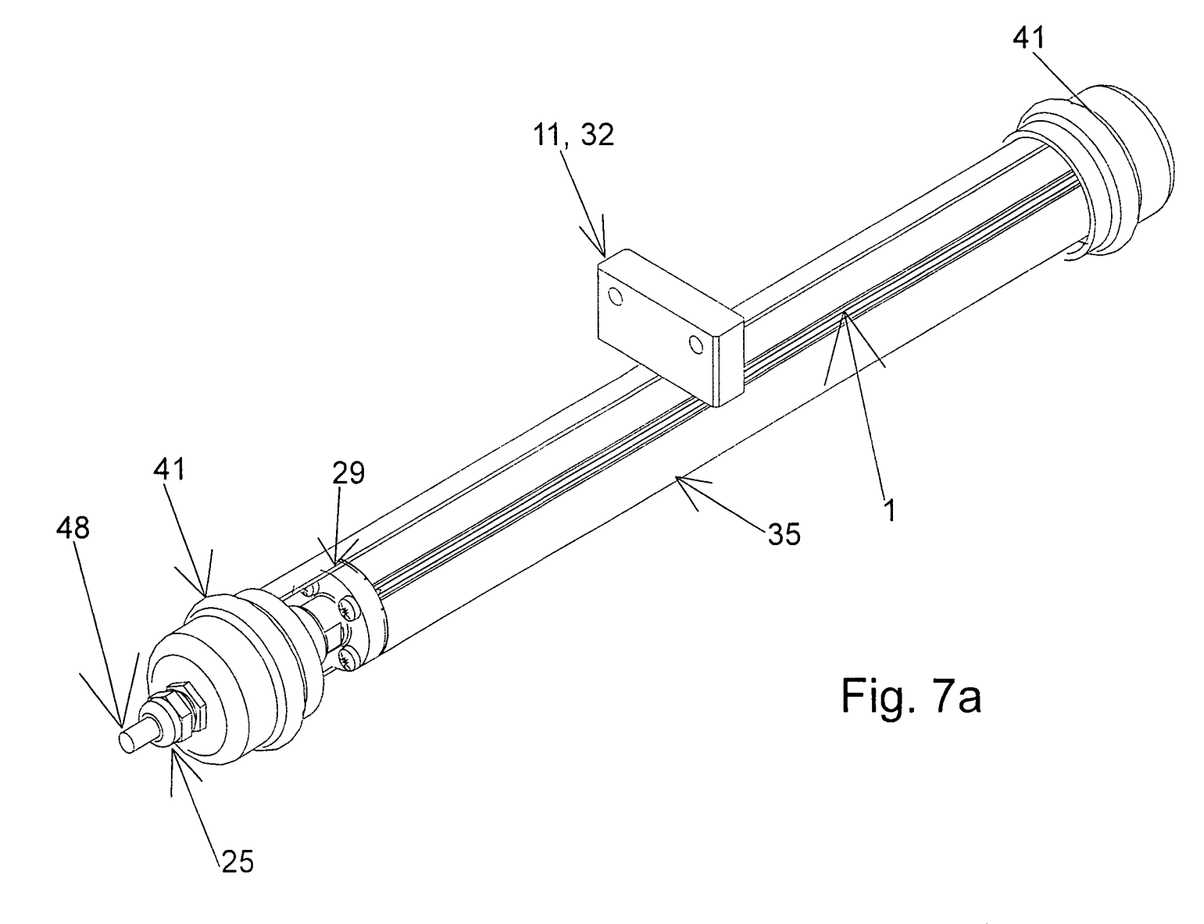
FIGS. 7a-7b illustrate a device according to FIG. 1 received in an additional protective tube.

FIG. 1*a* shows—different from sealing through an O-ring 24—a sealing of the front faces of profile 1 through bluntly placed closing caps 29 and insertion of a flat gasket 16. In one of closing caps 29' there is a central opening for threading in a cable grommet 25, through which a cable, only visible in FIG. 7, for conducting the signal is run out of interior space 14 of profile 1.

Closing caps 29 do not protrude beyond enveloping circle 21 of the outside contour 5 having bolt holes 34 in positions, where the undercut, deepened area 7*a* of the outer grooves 6 of profile 1 is located in order to fixate closing caps 29 in a solid manner to front faces 22' of profile 1 through bolts 42 reaching from the front from the outside through closing caps 29 and a flat gasket 16, self threading into outside grooves 6. Certainly before closing, processing electronics 12 located on printed circuit board 23 and wave conductor unit 2 are electrically connected, as well as the cable running into profile 1 is connected with processing electronics 12.

While the closing cap in FIG. 1*a* is a flat cap with constant thickness, in FIG. 1*b* another design of the closing cap 29" is shown. From front face 22 to be placed onto the front face of profile 1 close to the outer circumference several, in this case four, protrusions 17 reach out in an axial direction spaced along the circumference through which the closing cap 29" is directly pressed onto front face 22' of profile 1. The height of protrusions 17 is slightly less than the thickness of flat gasket 16 (or also of the protrusion of a O-ring 24 out of the respective ring groove 28) in a unloaded state, so that when tightening bolts 42, until protrusions 17 abut to front face 22', a defined precompression of flat gasket 16 is reached. At the location of protrusions 17, therefore certainly gaps 16*a* in flat gasket 16 are required, as shown in FIG. 2*a*.

Figure 2A:
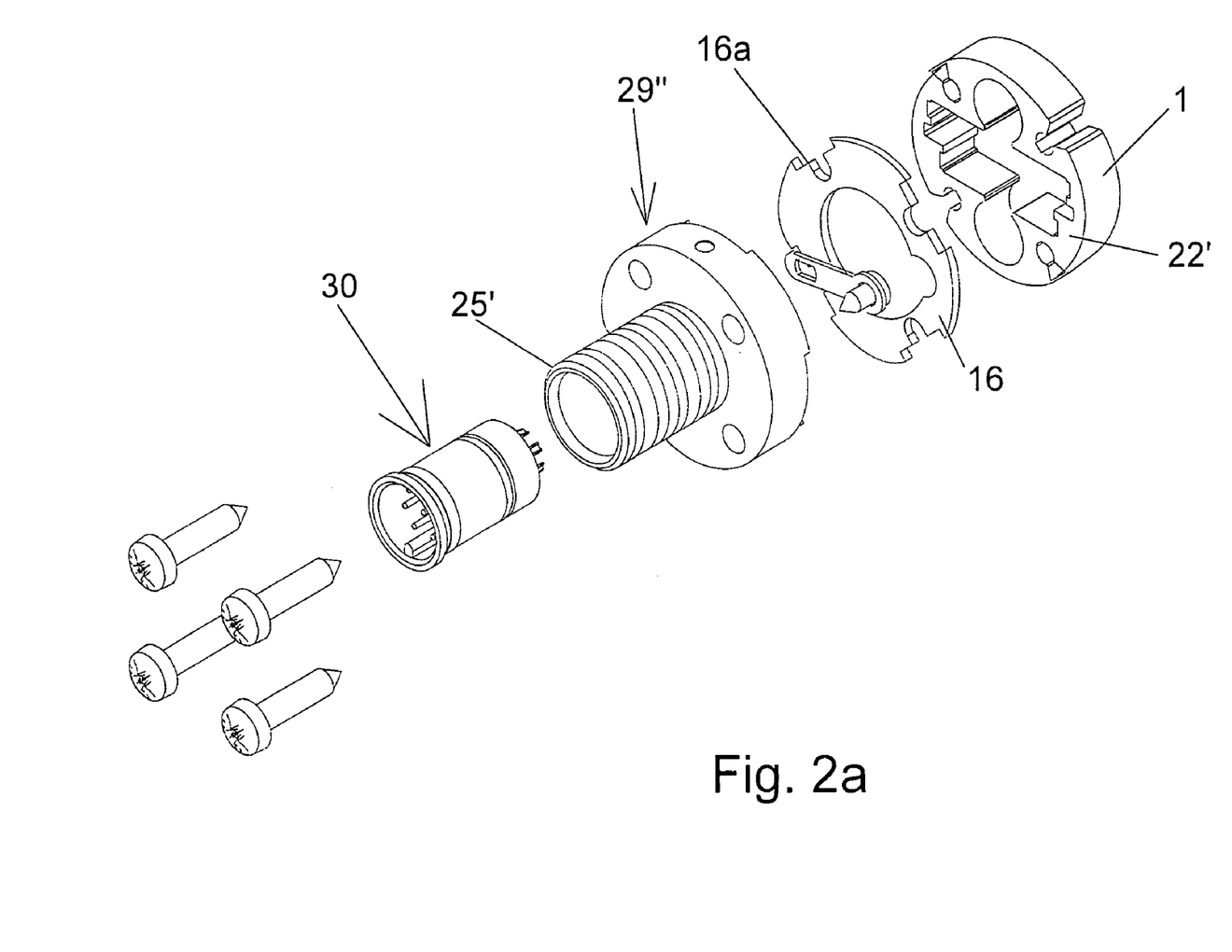
FIG. 2a illustrates alternate details of the device according to FIG. 1.

FIG. 2*a* again shows the assembly situation in an exploded view, however, with a different design of the closing cap 29''', wherein the cable grommet 25 is integrally formed with closing cap 29'''.

For conducting a signal to the outside, an exactly fitting plug 30 is inserted into cable grommet 25' axially from the outside towards a respective shoulder at the front end of the plug preventing further insertion.

An O-ring 24 in an annular groove on the outside of plug 30 seals it relative to an interior circumference of a cable grommet 25'. Into the interior of the profile soldering leads protrude which can be connected with the conductors coming from the processing electronics, wherein one of the soldering leads carries the ground which is bolted to front face 22 of closing cap 29''' through an electrically conducting bridge 53 in order to ground closing cap 29''' and profile 1 in contact therewith, both of them typically made from metal.

Figure 3A:
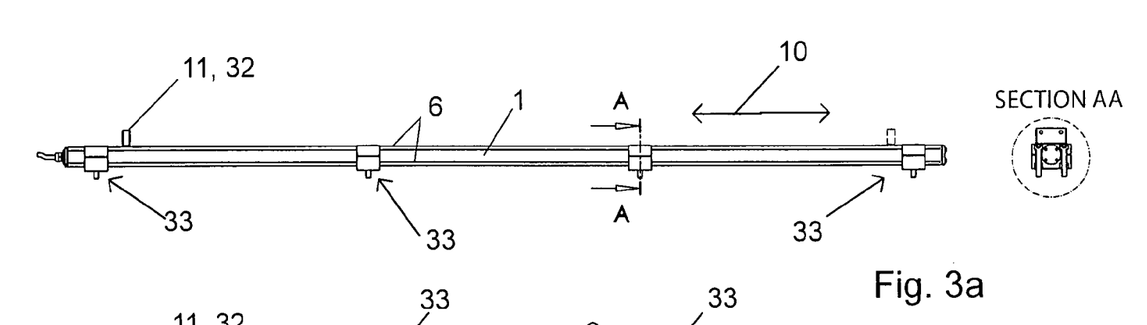
FIGS. 3a-3c illustrate a first mounting method of the device relative to a base.
Figure 3B:
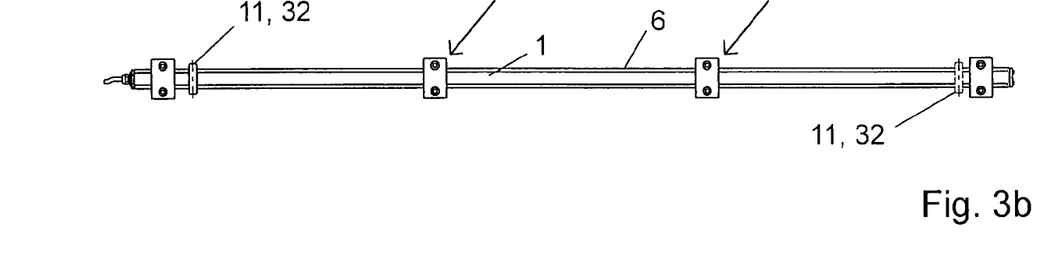
Figure 3C:
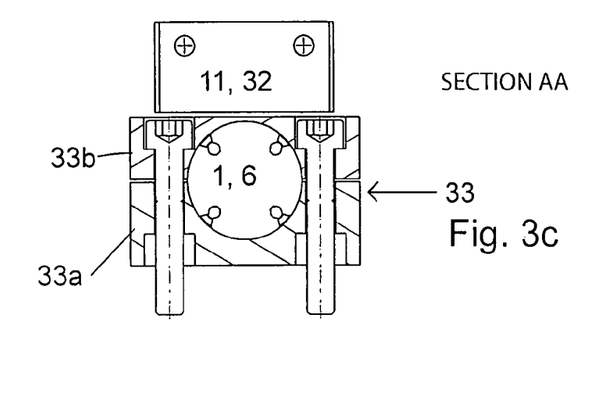
Figure 4A:
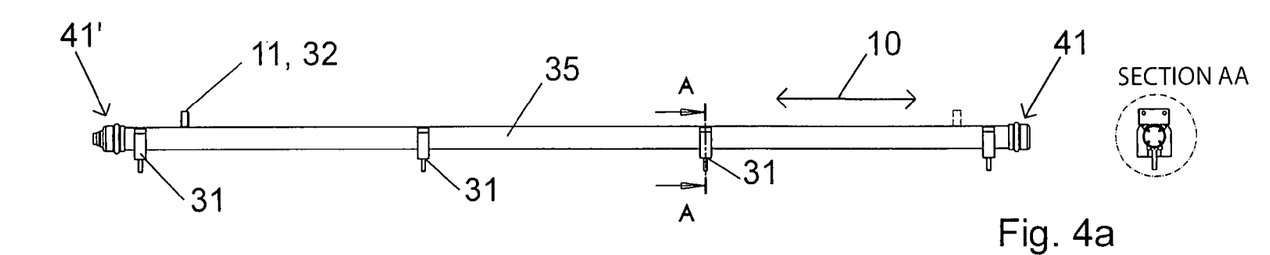
FIGS. 4a-4c show a second mounting method of the device relative to the base.
Figures 4B, 4C:
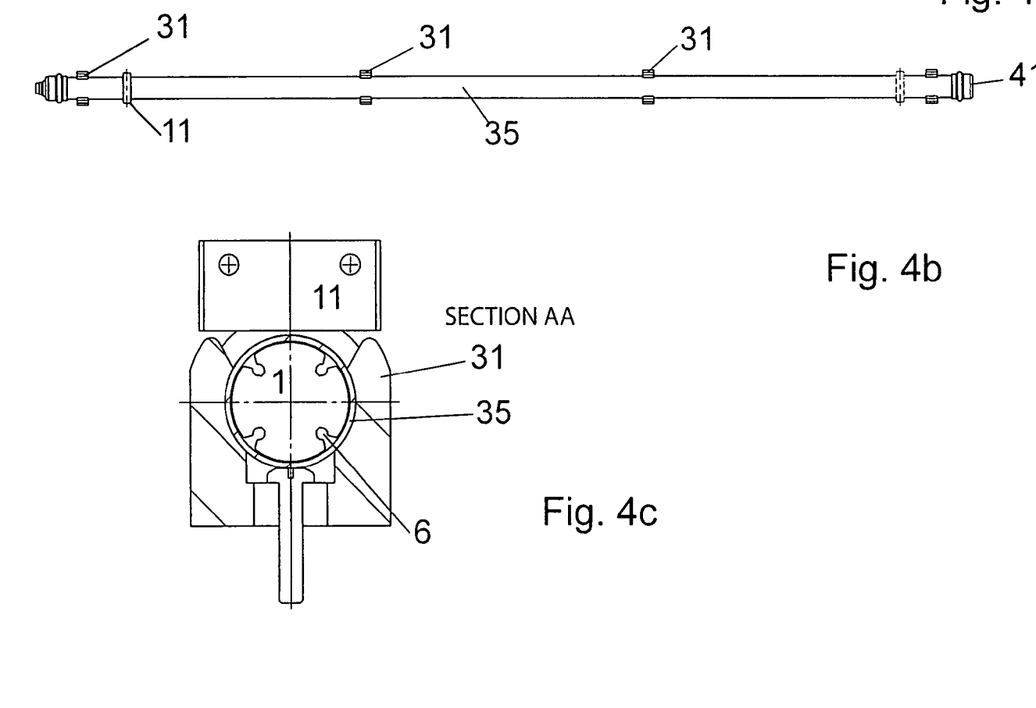
Figure 5:
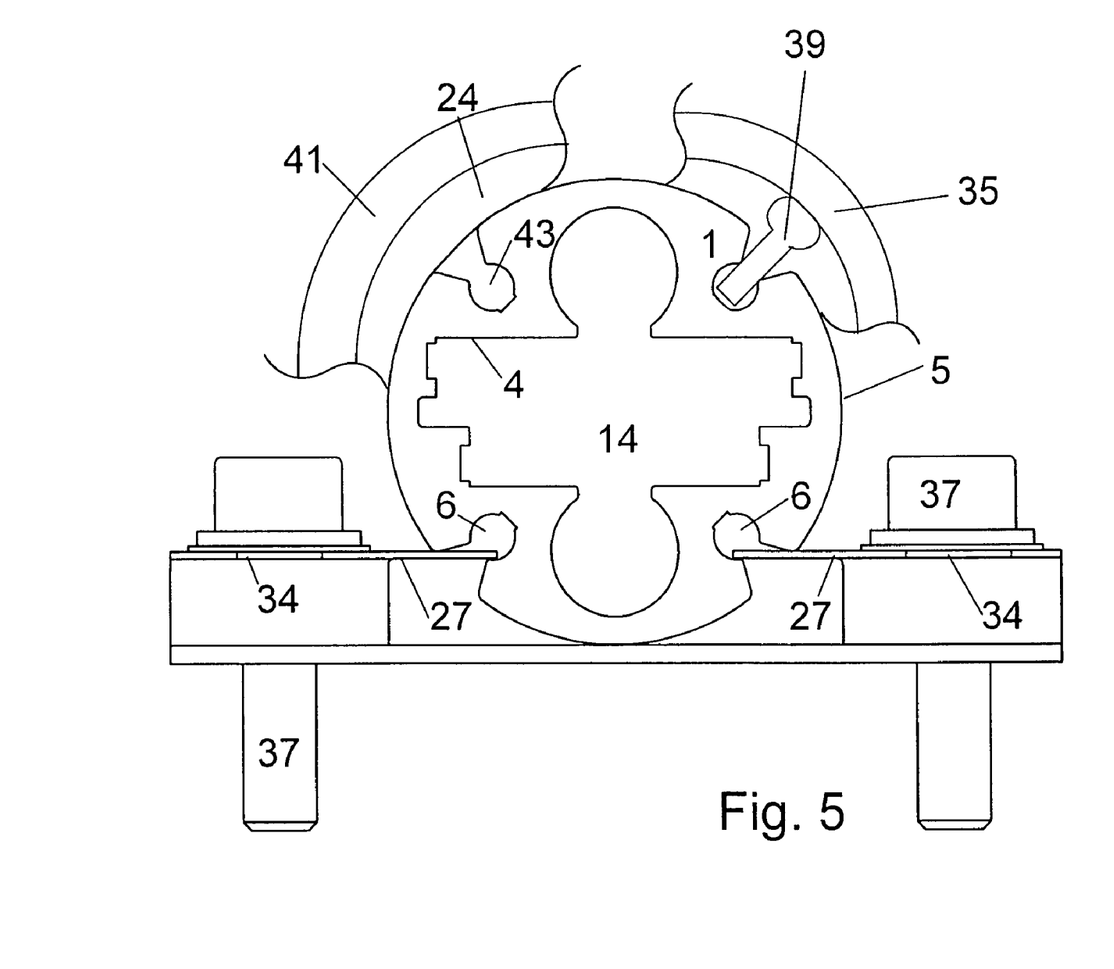
FIG. 5 illustrates a third mounting method of the device relative to the base.

FIGS. 3 to 5 show assembled distance measuring devices and their mounting to a base component, e.g. on a machine, that is not shown. In FIGS. 3 to 4 this is shown in a side view (FIG. 3a or FIG. 4a), top view (FIG. 3b, 4b) and a cut view (FIG. 3c, 4c).

Thereby, the suspension in FIG. 3 is performed through several two-piece bearing supports 33 comprising a lower shell 33a and an upper shell 33b, between which the outer circumference of the profile 1 is clamped. In each bearing support, two clamping bolts extend, on both sides of profile 1 through upper shell 33b and lower shell 33a and are bolted into a component below, which is not shown, e.g. a machine carrying a distance measuring device, whereby upper shell 33b is pressed against lower shell 33a and profile 1 is clamped in between in respective semicircular indentations of the two shells.

Spaced along the length of the profile are several of these bearing mounts 33, in this case four are located. Thereby, upper shell 33b in the middle above profile 1 is provided very thin and could even be interrupted here. Also, the heads of the bolts pressing the bearing shells against each other are preferably mounted flush into upper shell 33b.

This serves the purpose that the signal generating traveler 11, which can include e.g. a magnet 32, can be moved in longitudinal 10 over the whole measuring distance along profile 1, in a small distance to it, and for this purpose, as shown in FIG. 3c, also has to be moved over bearing mounts 33.

The lateral distance between traveler 11 and profile 1 can be kept the smaller, the smaller the thickness of the upper shell 33b, reaching over the profile 1 is made.

In FIGS. 3a and 3b the start and end positions of the same traveler 11 are shown.

In order to minimize the distance between the wave conductors 3, eccentrically located in profile 1 (not shown in FIG. 3) and traveler 11, it has to be known in which rotation position within profile 1 the wave conductor is located in order to be able to bring profile 1 into an optimum rotation position, before clamping it in bearing supports 33, wherein wave conductor 3 is closet to traveler 11.

Figure 6A:
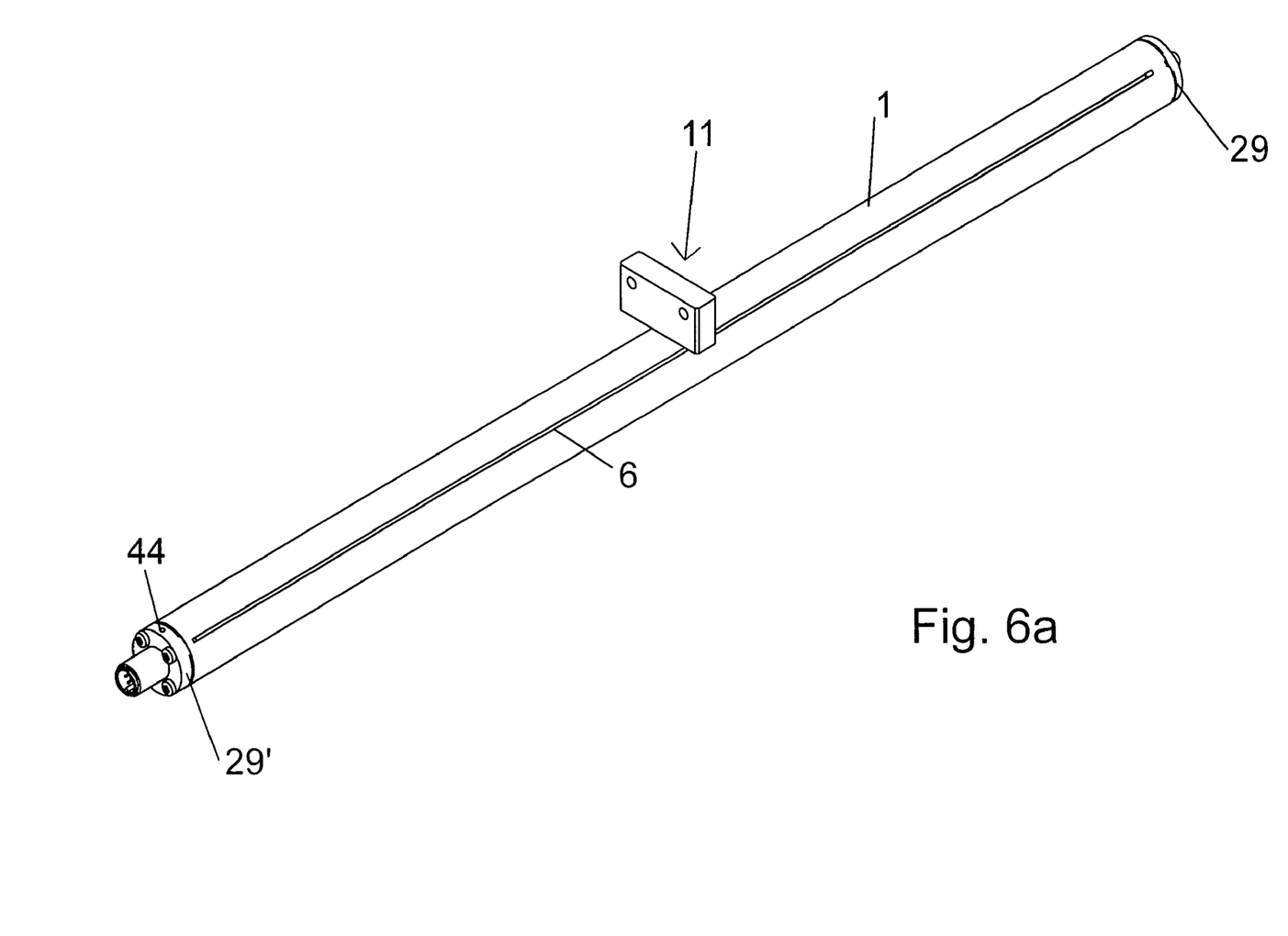
FIGS. 6a-6c show alternatives for guiding the signal generator.

For this purpose—as shown is FIG. 6a, leaving away bearing supports 33—at a location on the circumference of a closing cap 29, 29', a marker 44 is provided as a bore hole is located, indicating the rotation position of the wave conductor within the distance measuring device and thereby of profile 1.

FIG. 4 shows analogous embodiments wherein not profile 1 but a protective tube, located around profile 1 (as shown later in FIG. 7) having a round circumference is also mounted at several places, extending axially along the protective tube 35, to a component in the vicinity, which is not shown.

This time, customary hose clamps 31 are being used as in the plumbing and electrical industry. These tube clamps reach around the circumference of protective tube 35, shaped as a "C", by more than 180° of circumference, but they are open on top.

Through the elasticity of the lateral free ends of tube clamps 31 reaching upwards, typically made from plastic, the tube to be received, in this case, protective tube 35, can normally be pressed into tube clamp 31 which is already mounted to a base, so that an insertion in longitudinal direction 10 is not necessary, greatly facilitating the assembly, since after insertion a rotation of protective tube 35 together with the enclosed profile 1, and also a limited displacement in longitudinal direction is possible.

Also, here, a traveler 11, typically with a magnet 32 therein is moveable in longitudinal direction 10 as a signal generating element, along the upper side of the protective tube 35, spaced from it, facing away from the base. Since traveler 11 hereby also is to be moved over tube clamps 31, it is important that the upward protruding lateral ends of hose clamp 31 do not protrude, or only protrude a little, above the highest point of tube 35 received therein.

Sealing caps 41, 41', by which protective tube 35 is enclosed on one side, radially protrude beyond the outer circumference of protective tube 35. However, it is not necessary that traveler 11 can also be moved over these sealing caps 41 since they are outside of the measuring area.

FIG. 5, however, only shows in a cut view, with an empty profile 1, how this is mounted through mounting brackets 27 to a component, which is not shown:

For this purpose, profile 1—which in reality carries at least a wave conductor unit and a printed circuit board with processing electronics in its interior—is rotated so that it rests with a point on its circumference in the middle between two adjacent outside grooves 6 on the base.

Plate-shaped flat mounting brackets or also appropriately angled mounting brackets 27 can then be moved towards profile 1 in lateral direction 8 so that they reach with free ends into two lower opposing outside grooves 6 thereby securing profile 1 against lifting upwards in a form fit manner and against lateral displacement and against rotation.

Mounting brackets 27 have a bolt hole 34 for passing a bolt 37 through in an eccentric position so that after threading bolts 37 into their respective threads in the base, the engagement of the mounting brackets into the outside grooves 6 is possible through rotating the mounting brackets 27 around bolts 37 passing through it.

In case of FIG. 5, the two mounting brackets 27 and their bolts 37 are additionally connected through a common bridge reaching under profile 1, typically made from insulating material, silicone or another plastic, through which bolts 37 also extend.

Also, the mounting through mounting brackets 27, especially with longer profiles 1, is performed axially spaced in several positions. One of the advantages is—besides the low cost availability of the respective connectors as inexpensive mass produced items—that the larger portion of the circumference of profile 1 is not enclosed and thereby it is freely available for moving a traveler with magnet into its close vicinity, or for other purposes.

Furthermore, it is shown in the left half of FIG. 5 that profile 1 at its end can also be closed through a hat-shaped sealing cap 41 reaching over the profile 1, for which clamping elements 43 made from elastic material are inserted into the respective end areas of all outer grooves 6, completely filling the cross section of the outer grooves 6 in a tight manner.

As shown in the right half of FIG. 5 for receiving profile 1 in a surrounding, additional protective tube 35, whose interior circumference is slightly larger than the outside contour of profile 1, elastic spacers 39 are inserted radially protruding to the outside from profile 1, able to be compressed far enough when inserted into protective tube 35, so that they attach to the interior circumference of protective tube 35 under a preload. If such spacers 39 are inserted into all outside grooves, profile 1 is not only centered in the interior of protective tube 35 but also secured against unwanted displacement in longitudinal direction 10.

Figure 6B:
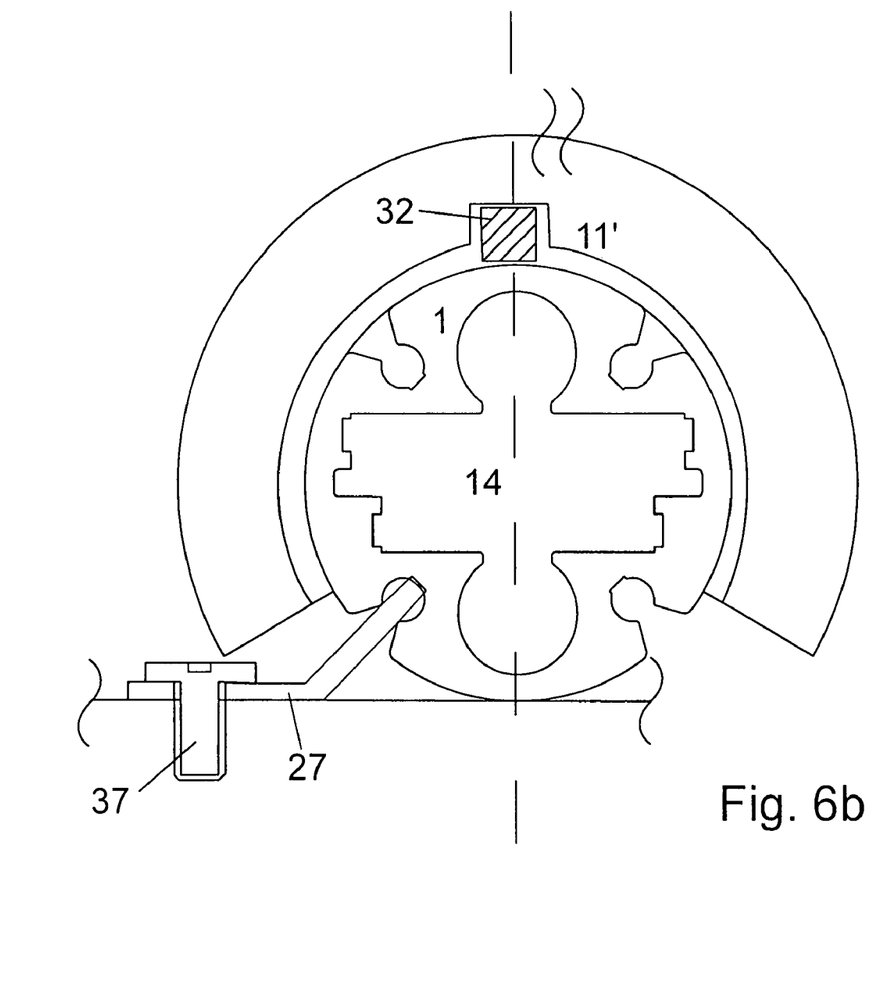
Figure 6C:
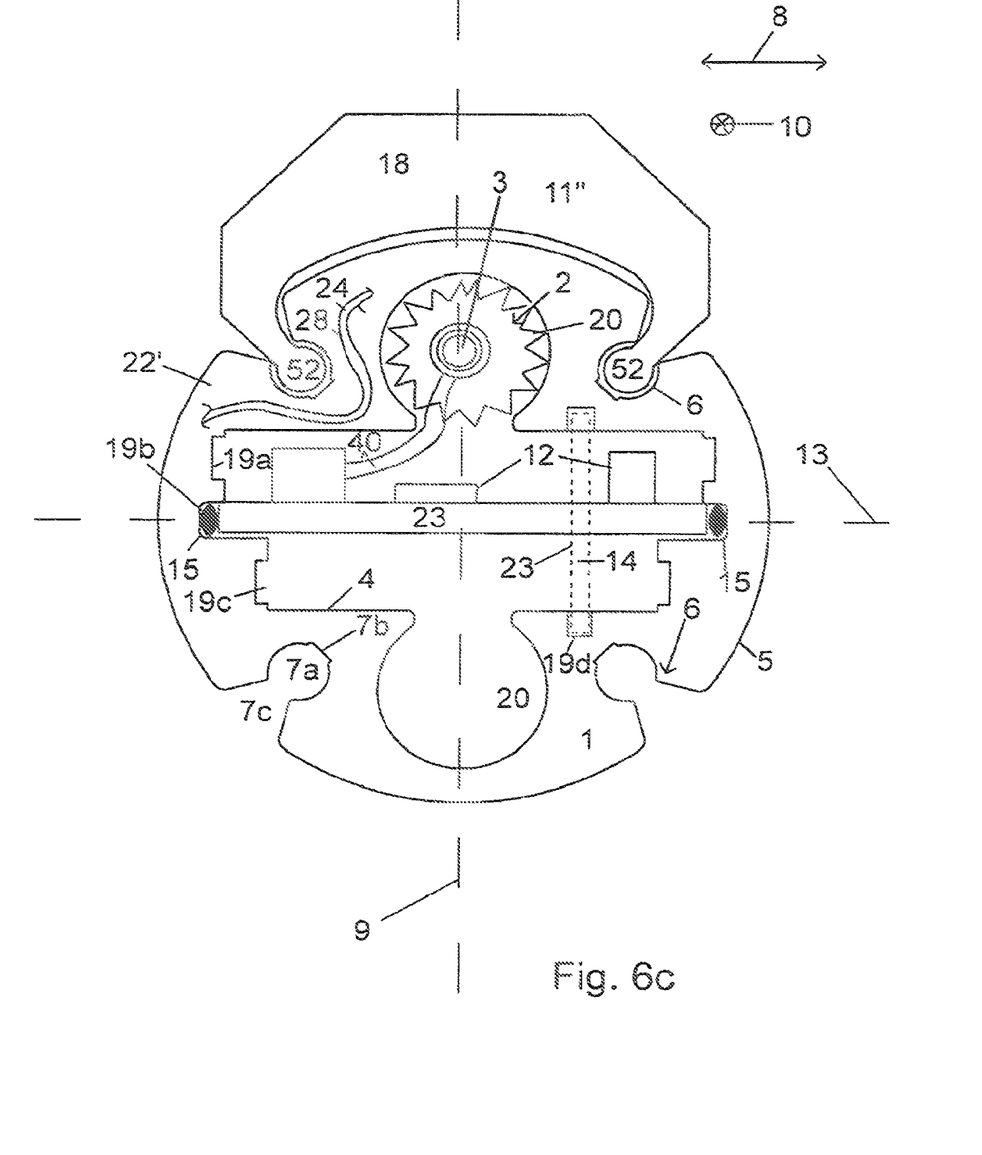

In FIGS. 3, 4 and 6, traveler 11 is shown with magnet 32 without form fit guidance along profile 1 or protective tube 35 and would, in reality, be mounted to a component which is guided along a component in the vicinity, which is not shown.

In case an always defined equidistant guidance along profile 1 or protective tube 35 shall be effected, an unencumbered part of the outer circumference of profile 1 or protective tube 35 has to be used as shown in FIG. 6b, 6c, wherein in FIG. 6b profile 1 is shown without interior equipment in order to simplify the display.

In case of FIG. 6b, a traveler 11' reaches around the outer perimeter of profile 1 as a circular segment, by more than 180° from the top wherein the opening of traveler 11' points downward. Through this reaching around by more than 180° and through the respectively small clearance in between, for which conventional components from known linear guides, thus, the so called "IGUS" linear guides can be used to prevent a lifting of traveler 11' to the upside and, thereby, always provide an exact radial positioning of traveler 11' relative to profile 1.

Through reaching around by more than 180° from the top, for example mounting profile 1 to the base via mounting brackets 27 according to FIG. 5 or to the right side of FIG. 6b is possible since it enables including its bolting 37, in particular when the bolting is laterally sufficiently spaced from profile 1, a respective reaching around through traveler 11' is possible.

When such a traveler 11" as shown in FIG. 6c has additional protrusions 52 reaching in a form fit and undercut manner into at least one, preferably two, upward slanted outer grooves 6 of profile 1, also a rotation of the traveler 11" around the longitudinal axis 10, around profile 1 is excluded. In this case, reaching by more than 180° around the outer circumference of the profile 1 is not necessary anymore.

The insertion of the traveler 11' or 11" in both cases is performed in longitudinal direction from the front end of profile 1, if necessary before placing closing caps 29, 29'.

Figure 7B:
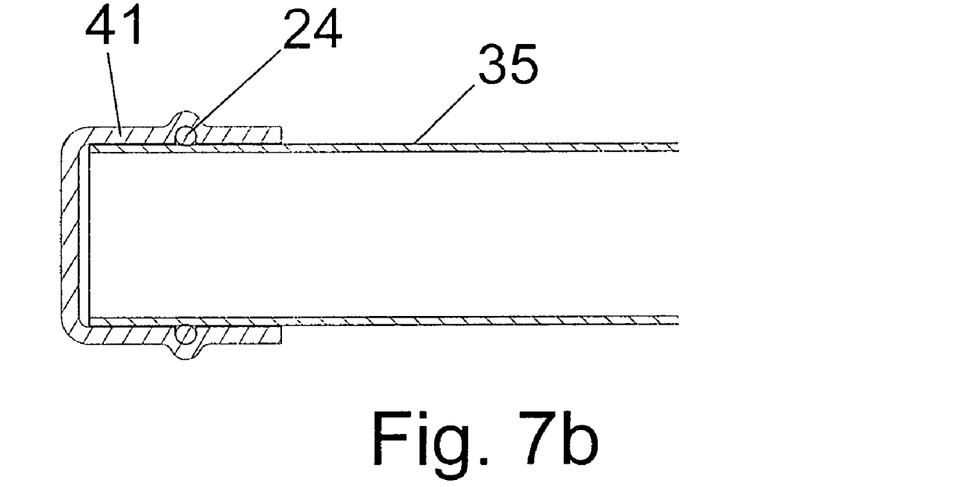

In case of the traveler 11' which does not rely on the presence of outer grooves 6, the guidance can also be performed along the outer circumference of protective tube 35 instead of along profile 1, as can been seen from FIG. 7.

There, in FIG. 7a, in a perspective partial cut view, it is shown that a ready assembled distance measuring device, whose profile 1 is closed by the end caps 29, 29' as described, is additionally inserted into a protective tube 35 precisely surrounding the profile 1, whose interior circumference is only slightly larger than the exterior circumference profile 1, so that here the closing caps 29 also do not protrude radially to the outside.

Protective tube 35 is typically not made from aluminum but from material resisting stronger mechanical or chemical impact, e.g. stainless steel.

This additional housing is provided for especially aggressive environments. The cable 48', run out of closing cap 29' certainly has to be run out of protective tube 35 for conducting the signals.

Protective tube 35 is closed at its front end through so called "Sanpress" technology, through placing pod shaped, sealing caps 41, 41', fitting with their interior circumference exactly onto the exterior circumference of protective tube 35, onto the open front ends of protective tube 35, as can be seen best in the detailed display of FIG. 7b.

The sealing caps 41 thereby typically are made of metal, e.g. stainless steel and they have an interior circumferential groove wherein an O-ring is already inserted. After axial positioning of the sealing caps 41 onto protective tube 35, a clamping of the circumferential areas of sealing caps 41 against the circumference of protective tube 35 is performed, through which the O-ring inserted into sealing cap 41 is firmly and durably pressed along its entire circumference against the exterior circumference of protective tube 35. Thereby not only a gas and dust proof connection between sealing cap 41 and protective tube 35 is effected but also a durable axial fixation between the two components.

As with closing cap 29, also sealing cap 41' differs through the additional cable grommet 25 centrally located therein from the enclosed version of the sealing cap 41. Through cable grommet 25, the cable 48, which is run out of the front of the distance measuring device, is run out of protective tube 35. In the area in between, this cable 48 is surrounded and protected through a cable guide 49 from stiff material, in the interior of protective tube 35.

REFERENCE NUMERALS

1 Profile
2 Wave conductor unit
3 Wave conductor
4 Inside Contour
5 Outside Contour
6 Outside Grooves
7 Combination Grooves
8 Lateral Direction
9 Longitudinal Center Plane
10 Longitudinal Direction
11 Traveler
12 Processing Electronics
13 Lateral Center Plane
14 Interior Space
15 String
16 Flat Gasket
16a Indentation
17 Protrusion
18 Roof
19 Printed Circuit Board Groove
20 Wave Conductor Groove
21 Enveloping Circle
22 Front Face
23 Printed Circuit Board
24 0-ring
25 Cable Grommet
26 Plug Pass Through
27 Mounting Brackets
28 Annular Groove
29 Closing Cap
30 Plug
31 Tube Clamp
32 Magnet
33 Bearing Support
34 Bolt Hole
35 Protective Tube
35a Interior Circumference
36 Bore Hole
37 Bolting
38 Serrated Hose
39 Spacer
40 Conductor
41 Sealing Cap
42 Bolt
43 Clamping Elements
44 Marker
48 Cable
49 Cable Guide
52 Protusion
53 Bridge

The invention claimed is:

1. A distance measuring device, said device comprising:
a longitudinally extending housing shaped as a hollow circumferentially closed profile (1) with a constant cross section contour in longitudinal direction (10);
a wave conductor unit (2) in the interior of the profile (1), wherein a wave conductor (3) of the wave conductor unit (2) extends in longitudinal direction (10) of the profile (1);
processing electronics (12) in an interior of the profile (1);
a traveler (11) moveable in longitudinal direction (10) along the outside of the profile (1) with a magnet (32) as a signal generator; and
an outer contour (5) of the profile (1) shaped and positioned in a form fit and defined manner in lateral direction (8) in a circular interior contour (4) of an external element surrounding the outside contour (5) of the profile (1) by more than 180° of a circumference of the profile (1) so that the profile (1) can be rotated in this interior contour (4), wherein in said outer contour (5) of said profile (1) outside grooves (6) are located symmetrically spaced along the circumference and said outside grooves (7) are vase shaped with a cross section (7a) shaped as a circular segment extending over more than 180° in a lower positioned area of the outside groove (7) having a flat bottom (7b) and a V-shaped neck 7(c) expanding from an opening of the lower positioned area of the outside groove (7) towards an outside.

2. The distance measuring device according to claim 1 wherein said device is a magnetostrictive distance measuring device and said wave conductor (3) is made from of magnetostrictive material.

3. The distance measuring device according to claim 1 wherein said outside grooves (6) are provided as combination grooves (7) enabling, on the one hand, threading in bolts (42) in longitudinal direction (10) of the grooves (6), as well as the insertion of plate shaped elements in lateral direction (8).

4. The distance measuring device according to claim 1 wherein said outside contour (5) of said profile (1) is provided symmetrical to a longitudinal center plane (9) and to a lateral center plane (13), perpendicular to it, and four combination grooves (7) are spaced along a circumference of the profile (1).

5. The distance measuring device according to claim 1 wherein said interior contour (4) includes at least one wave conductor groove (20) and at least one pair of printed circuit board grooves (19) on two opposing sides of the interior contour (4), opposing each other on a longitudinal center plane (9), two identical wave conductor grooves (20), and two printed circuit board grooves (19).

6. The distance measuring device according to claim 1 wherein at least two pairs of printed circuit board grooves (19) are located in the area between the wave conductor grooves (20) so that an inserted printed circuit board (23) would extend perpendicular to a connection line between wave conductor grooves (20), thus a longitudinal center plane (9).

7. The distance measuring device according to claim 1 wherein at least three pairs of printed circuit board grooves (19) are located in said interior contour (4), wherein at least two pairs of printed circuit board grooves (19) have a different distance of the grooves of a pair amongst each other, for printed circuit boards (23 a,b) of different widths.

8. The distance measuring device according to claim 1 wherein at least two pairs of circuit board grooves (19) are located in said interior contour (4) so that the circuit board grooves (19) are located next to wave conductor grooves (20) and printed circuit boards (23) inserted into the pairs (19) would be extending parallel to the connection line between the wave conductor grooves (20).

9. The distance measuring device according to claim 1 including printed circuit board grooves (19) and wave conductor grooves (20) open towards a common interior space (14), enclosed by the profile (1).

10. The distance measuring device according to claim 1 wherein said profile (1) is made from solid metal between said outside contour (5) and said inside contour (4), formed by an interior space (14) with printed circuit board grooves (19) and with wave conductor grooves (20), and the wall thickness of the profile (1) measured in a radial manner at the location of the maximum thickness is at least three times the wall thickness compared to the location of the minimum wall thickness.

11. The distance measuring device according to claim 1 wherein at least part of said processing electronics (12) is located on at least one printed circuit board (23) inserted into printed circuit board grooves (19).

12. The distance measuring device according to claim 1 wherein said interior contour (4) is symmetrical at least to a longitudinal center plane (9), also to a lateral center plane (13).

13. The distance measuring device according to claim 1 wherein a printed circuit board (23) is held in a pair of printed circuit board grooves (19) through a string (15) located with preload in lateral direction (8) between a narrow side of the printed circuit board (23) and a respective printed circuit board groove (19), elastic in lateral direction, a silicone string, or a silicone hose, elastic in longitudinal direction.

14. The distance measuring device according to claim 1 wherein said wave conductor unit (2) and at least one printed circuit board (23) with processing electronics (12) are separately positioned and fixated within said interior contour (4) of said profile (1) and only connected in an electrically conductive manner amongst each other.

15. The distance measuring device according to claim 1 wherein a fixation in lateral direction (8) is performed through form fit and in longitudinal direction (10) preferably through friction.

16. The distance measuring device according to claim 1 wherein said profile (1) is closed through respective closing caps (29, 29') on its faces, bluntly placed on a face of said profile (1) and bolted into outside grooves (6) in longitudinal direction (10), therefore having bolt holes (34) according to a position of the outside grooves (6).

17. The distance measuring device according to claim 16 wherein said closing caps (29, 29') do not radially protrude to the outside beyond an enveloping circle (21) of the outside contour (5) and not beyond the outside contour (5) of the profile (1).

18. The distance measuring device according to claim 16 wherein said closing cap (29, 29') further includes on its face (22) pointing towards said profile (1), on its outer circumference, several protrusions (17) spaced along the circumference for direct abutment to the face (22') of said profile.

19. The distance measuring device according claim 16 wherein between said closing cap (29, 29') and said profile (1) a flat gasket (16) is located having indentations (16a) open towards an outer circumference for receiving protrusion (17) of said closing cap (29, 29').

20. The distance measuring device according to claim 19 wherein said flat gasket (16) does not protrude beyond an enveloping circle (21) or the flat gasket protrudes in a defined manner along sections of the circumference, beyond the enveloping circle so that protrusions can be used for centering relative to a surrounding protective tube (35), causing friction in longitudinal direction (10) in an interior of the protective tube (35).

21. The distance measuring device according to claim 16 wherein at least one of said closing caps (29) further includes an integrally formed cable grommet (25) surrounding a plug pass through (26) formed in said at least one of closing cap (29).

22. The distance measuring device according to claim 16 wherein said closing caps (29, 29') and/or said profile (1) are made from electrically conductive material.

23. The distance measuring device according to claim 1 wherein said signal generator is located in said traveler (11) which is guided relative to a component carrying the device so it can be moved in longitudinal direction (10) or it is guided in a form fit manner relative to said profile (1) or a protective tube (35), so it can be moved in longitudinal direction (10).

24. The distance measuring device according to claim 1 wherein said traveler (11) further includes guidance protrusions (52) extending downwards from its roof (18) engaging into at least two upper outside grooves (6) in a form fit manner.

25. The distance measuring device according to claim 1 wherein said traveler (11) further includes commercially available sliding guides shaped as a circular arc covering more than 180° with circular interior contour, so called "IGUS" sliding guides, running on the exterior circumference of the profile (1) or of a protective tube (35).

26. The distance measuring device according to claim 1 wherein at an outer circumference of at least one of the closing caps (29, 29') and/or of the profile (1) a non removable marker (44) for emphasizing a position of said wave conductor (3) in said profile (1) is located.

27. The distance measuring device according to claim 1 wherein said device is inserted into a protective tube (35) with circular interior circumference and exterior circumference made from metal and positioned in a form fit manner in lateral direction (8) through an interior circumference of the tube.

28. The distance measuring device according to claim 27 wherein the interior circumference (35*a*) of said protective tube (35) is slightly larger than an exterior circumference of said profile (1) and said profile (1) is positioned in the protective tube (35) in longitudinal direction through friction and centered in lateral direction through spacers (39) inserted from outside into outside grooves (6) of said profile (1), protruding from them radially.

29. The distance measuring device according to claim 28 wherein said spacers (39) are made from a slip inhibiting material like rubber or silicone, are an O-ring or a section of silicone hose, whose thickness is slightly larger than the smallest opening/width of outside groove (6) and which is radially inserted with its main plane into the outside groove (6) so it protrudes slightly to the outside.

* * * * *